Dec. 29, 1959  F. A. KROHM  2,918,690
WINDSHIELD WIPER ARM
Filed Oct. 20, 1955
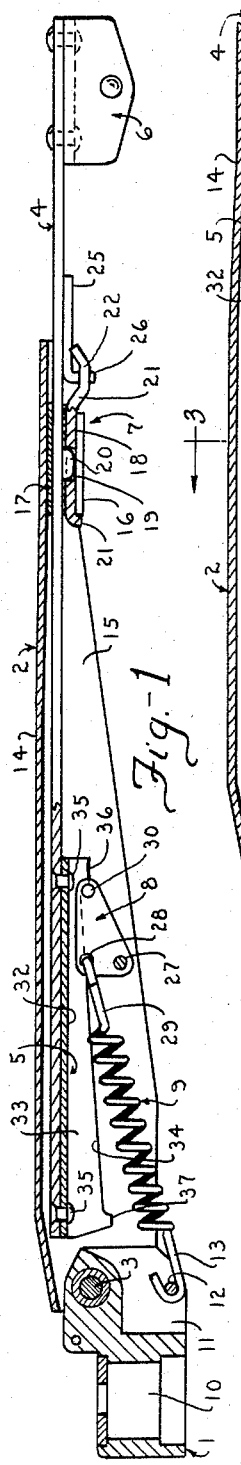
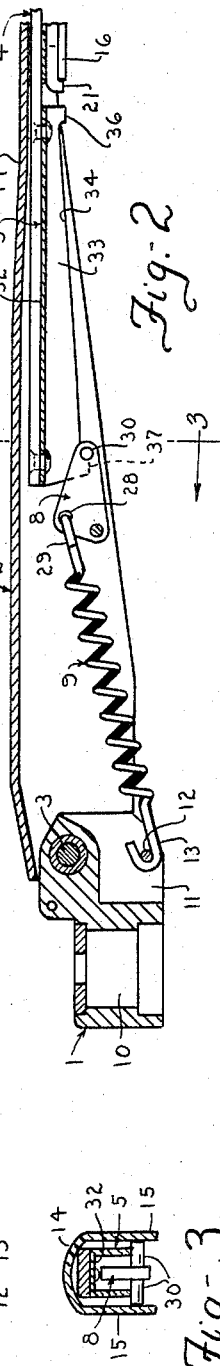
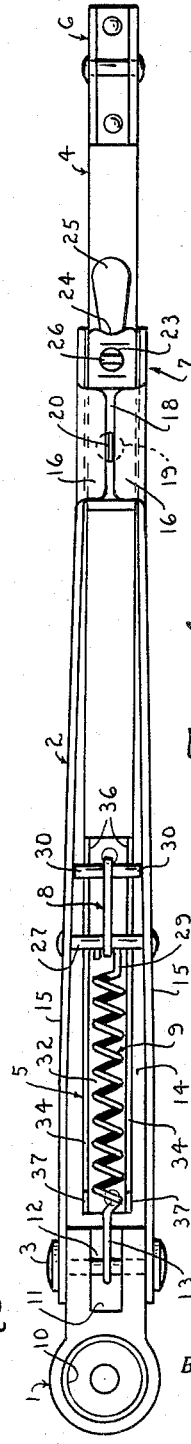
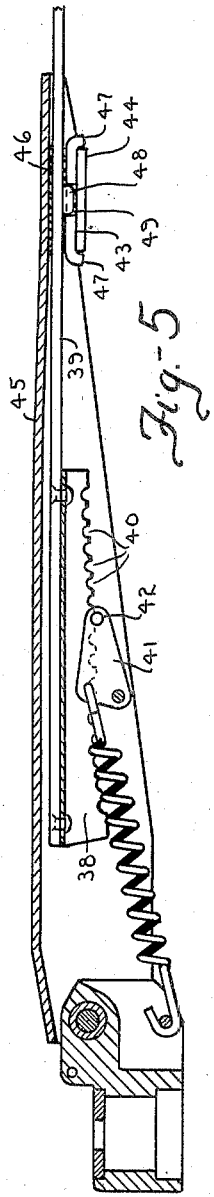
INVENTOR.
FRED A. KROHM
BY Charles S. Penfold
ATTORNEY

United States Patent Office 2,918,690
Patented Dec. 29, 1959

2,918,690

WINDSHIELD WIPER ARM

Fred A. Krohm, Hobart, Ind., assignor to The Anderson Company, Gary, Ind., a corporation of Indiana Application October 20, 1955, Serial No. 541,670

4 Claims. (Cl. 15—255)

This invention relates generally to windshield wiper equipment and more particularly is directed to improvements in a wiper arm.

The majority of conventional windshield wiper arms in use include an inner shaft attaching part and an outer blade-carrying section pivotally connected to the inner part with biasing means for urging the outer section toward a windshield. The biasing means of these arms may be in the form of a helical spring or leaf spring.

In some of the arms no provision is made for adjusting the spring pressure whereas in other arms individual manually operable means are employed for the purpose. More particularly in this regard, the patent of Theodore J. Smulski, No. 2,326,402, discloses an extensible blade-carrying section with a separate manual adjustment whereby the force of a biasing spring subassembly may be increased or decreased when the extensible section is extended or retracted. Such a manual adjustment is desirable but ofttimes the adjustment is never used, and if used there is no way to determine the amount of pressure required for any longitudinal position to which the extensible section may be moved.

With the foregoing in mind, the principal object of the invention is to provide an improved wiper arm whereby the force exerted by the biasing means is automatically varied in accord with the longitudinal position of the extensible blade-carrying section. This automatic adjustment or regulation of the force serves to maintain a uniform wiper arm pressure on the wiper blade in order to obtain a good wiping action.

More particularly, the object of the invention is to provide a wiper arm which includes an inner part for attachment to a shaft, an outer unit comprising an intermediate section pivotally connected to the inner part, an extensible or outer blade-carrying section mounted on the intermediate section, movable means carried by the intermediate section, biasing means operatively connecting the inner part and movable means, and actuating means preferably in the form of cam means carried by the extensible section for actuating and influencing the movement of the movable means to automatically vary the tension or force exerted by the biasing means. The movable means and cam means are preferably so designed and constructed that the proper amount of force is automatically obtained or regulated in accord with any longitudinal position that the extensible section is moved.

A particular object of the invention is to provide movable means on the intermediate arm section with abutment means preferably comprised of a pair of abutments and preferably provide the actuating means with a pair of cam surfaces which respectively engage the abutments in order to provide a well-balanced and efficient operating mechanism for imparting movement to the movable means.

An important object of the invention is to provide the actuating means with means cooperable with the abutments for selectively and automatically detaining the extensible section in any one of a plurality of predetermined positions to which it may be adjusted.

A significant object of the invention is to provide the actuating means with stops which are engageable with the abutments for determining the travel extent of the extensible arm section.

Additional objects and advantages of the invention will become apparent after the description hereinafter set forth is considered in conjunction with the drawings annexed hereto.

In the drawings:

Figure 1 is a longitudinal sectional view of the wiper arm showing the extensible or blade-carrying section in a retracted position;

Figure 2 is a partial longitudinal sectional view similar to Figure 1, showing the blade-carrying section in a fully extended position;

Figure 3 is a transverse section taken substantially on line 3—3 of Figure 2;

Figure 4 is a bottom view of the arm shown in Figure 1; and

Figure 5 is a longitudinal sectional view of a modified form of wiper arm.

Referring first to the structure illustrated in Figures 1 through 4 of the drawing, the arm, among other things, includes an inner part or section generally designated 1 for attachment to a shaft and an outer unit comprising an intermediate channel section 2 connected to the part 1 by a pivot 3 and a section 4 which is slidable or extensible on the channel section. The inner extremity of the extensible section is provided with actuating means 5 and its outer extremity with a connector 6 for detachable connection with a wiper blade. The channel section 2 is provided with clamping means 7 for holding the extensible section in any longitudinal position desired and is further provided with a movable or rockable means 8. A biasing means 9, preferably in the form of a helical spring, is operatively connected to the rockable means and the part 1 for holding the rockable means and actuating means in a cooperative relationship and for urging the outer unit and a blade thereon toward a windshield.

The inner part 1 may be designed and constructed in various ways, but as herein shown is provided with a tubular portion 10 for detachably receiving a shaft and a radial portion provided with a transverse aperture through which the pivot 3 projects. The radial portion is also provided with a longitudinal recess 11 which forms a pair of parallel walls. A cross pin 12 is supported on the walls and a hooked inner end 13 of the spring 9 extends into the recess and is attached to the pin.

The intermediate channel section 2 of the arm may also be designed and constructed in various ways, but as depicted includes a base wall 14 and corresponding substantially parallel side walls 15 which taper in a direction toward the outer end of the section. The inner end portions of the side walls straddle the radial portion of the part 1 and are provided with apertures through which the pivot 3 extends for pivotally connecting section 2 and part 1.

The clamping means 7 employed for adjustably holding the extensible blade-carrying section 4 in any desired longitudinal position will now be explained. The outer end portions of the side walls 15 of the channel section are relatively narrow and provided with inturned opposed flanges 16 disposed in parallel relation to the base wall 14 of the channel. A resilient liner 17 embraces the extensible section and an elongated fitting 18 is interposed between the flanges and portions of the liner. The fitting is provided with a hole 19 and the liner with a finger 20 disposed in the hole for holding the liner in place. This liner serves to promote the sliding action of the extensible section 4 by preventing gauling between this section and the fitting and channel. The fitting is provided with a pair of longitudinally spaced shoulders 21 which cooperate with the ends of the flanges 16 to prevent displacement of the fitting and liner connected to the fitting. The fore end of the fitting is provided with an offset 22 having an opening 23 and a notch 24 therein. A lever 25 is held in pivotal relationship to and between the extensible section and offset by a lug 26 extending into the opening 23. The arrangement is such that when the lever is moved to the position shown for disposition in the notch 24 the offset 22 of the fitting will be placed under tension to produce a clamping action of the fitting against the liner and the latter against the extensible section for holding the section in place. Movement of the lever to a transverse position will relieve the tension on the offset and permit one to move the extensible section to any longitudinal position desired.

The mode of mounting the rockable means 8 on the channel section 2 will now be described. An axle member 27 is secured to the side walls 15 of the section 2 at a location substantially forward of the pivot 3. This axle constitutes a fulcrum supporting the rockable means 8. More specifically in this regard, the rockable means is preferably made in the form of a generally flat triangular element with one corner thereof being connected to the axle for movement about the latter's axis. A second corner of the element is preferably provided with an aperture 28 which detachably receives an outer hooked end 29 of the spring 9. The third and fore corner of the element is preferably provided with a cross member forming a pair of lateral corresponding abutments 30 which are normally held against the actuating means 8 through the agency of the spring.

The actuating or cam means 5 above referred to may be formed as an integral part of the extensible arm section 4, but is preferably made in the form of separate channel member having a base wall 32 and side walls 33 provided with inclined marginal edges forming cam surfaces 34 which respectively engage the lateral abutments 30 carried by the rockable means 8. The width of the base wall of this channel is substantially the same as the width of the extensible section and is preferably secured to the latter by rivets 35. It will be noted that the space between the side walls provides clearance for movement of the rockable means. The side walls of the channel are provided with front stops 36 and rear stops 37 adjacent the ends of the cam surfaces for engagement with the abutments 30 to determine the longitudinal travel of the extensible section 4 with respect to the intermediate section 2.

As substantially illustrated in Figure 1, the extensible section is in a retracted position with the abutments engaging the front stops 36 to limit inward travel of the section, whereas in Figure 2 the abutments are in engagement with the rear stops 37 to limit outward travel of the section. The extensible section can be readily secured in either of the aforesaid positions or in any intermediate longitudinal position by merely manipulating the clamping means 7 before and after the section is moved to the position desired. Stop means other than those shown may be utilized to limit the travel of the extensible section. For example, the stops 36 and 37 could be omitted so that the ends of the channel member may engage the part 1 and fitting 18 for determining the sliding distance of the extensible section.

In view of the foregoing, it will be manifest that when the extensible blade-carrying section 4 is moved outwardly from the position shown in Figure 1 the cam surfaces on the actuating or cam means will slide on the abutment means 30 carried by the rockable means and thereby move or pivot the rockable means in a clockwise direction as viewed in Figure 2. In other words, the rockable means serves to move the point of connection between the rockable means and spring relative to the outer arm unit and has the effect of connecting the spring at different longitudinal locations to the outer unit. This outward movement of the extensible section causes a gradual increase in the tension of the spring to impart a greater wiper arm pressure on the blade. Inward movement of the extensible section allows the spring to move the rockable means in a counterclockwise direction and thereby decreases the tension of the spring. The organization of components is unique because the tension of the spring is varied automatically by merely moving the extensible section 4 with respect to the intermediate channel section 2.

A modified arm structure is exemplified in Figure 5 of the drawing. In this embodiment, an actuating or cam means 38, carried by an extensible arm section 39, has side walls provided with cam surfaces which are interrupted by detents 40, preferably formed by notching the side walls. The arm is also provided with movable means 41 having abutments 42 thereon which are adapted for selective engagement with the detents for automatically detaining the extensible arm section in any one of the longitudinal positions selected. The clamping means 7, above referred to, is omitted, and in lieu thereof, a fitting 43 is secured between flanges 44 on an intermediate arm section 45 and a liner 46 is secured about the extensible section. The fitting is held against longitudinal displacement by a pair of shoulders 47 which engage the flanges and the liner is held against displacement by a finger 48 extending into a hole 49 in the fitting as shown. The liner 46 serves the same purpose as the liner 17 above referred to.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A windshield wiper arm comprising a shaft attaching part, an intermediate section pivotally connected to the part and provided with a pivotal element having offset abutments, an elongate outer section slidable on the intermediate section, said outer section having an outer extremity for supporting a wiper blade and an inner extremity, the inner extremity of the outer section being provided with a pair of walls respectively engaging the offset abutments for actuating the pivotal element, and biasing means operatively connecting the part and element for urging the intermediate and slidable sections as a unit relative to the part, the arrangement being such that when the outer section is slid relative to the intermediate section the abutments on the element and the walls of the actuating means coact and vary the force exerted by the biasing means.

2. A windshield wiper arm comprising an inner shaft attaching part, an outer unit comprising an intermediate section pivotally connected to the attaching part and a blade-carrying section slidably mounted on the intermediate section, an element pivoted on the intermediate section and provided with a forwardly extending portion having offset abutments, a spring connected to the part and to the element at a location spaced inwardly from the abutments, and a channel carried by said slidable section having walls slidably engaging said abutments for varying the force exerted by the spring.

3. A windshield wiper arm comprising an inner shaft attaching part, an outer unit comprising an intermediate channel section having side portions pivotally connected to the attaching part and a blade-carrying section slidably mounted on the intermediate section between its side portions, said slidable section having an inner extremity provided with a channel formation having side walls, an element having three corners, a pivot extending through the side portions of the intermediate section and one corner of the element for pivotally connecting the element thereto, a cross member carried by a second corner of the element and engaging the side portions of the channel formation at a location forwardly of the pivot, and biasing means operatively connecting the attaching part and a third corner of the element, the relationship of the channel formation and cross member being such that when the slidable section is slid relative to the intermediate section the element pivots and thereby varies the force exerted by the biasing means.

4. A windshield wiper arm comprising a shaft attaching part, an intermediate section pivotally connected to the part and provided with a pivotal element having offset abutments, an elongate outer section slidable on the intermediate section, said outer section having an outer extremity for supporting a wiper blade and an inner extremity, the inner extremity of the outer section being provided with a pair of walls having longitudinally spaced abutments for selectively engaging the offset abutments for actuating the pivotal element, and biasing means operatively connecting the part and element for urging the intermediate and slidable sections as a unit relative to the part, the arrangement being such that the outer section may be slid relative to the intermediate section so that the abutments on the element are caused to selectively engage the abutments on the walls of the actuating means for coaction therewith to vary the force exerted by the biasing means and hold the outer section in the position selected.

References Cited in the file of this patent

UNITED STATES PATENTS

| | | |
|---|---|---|
| 2,326,402 | Smulski | Aug. 10, 1943 |
| 2,531,889 | Oishei et al. | Nov. 28, 1950 |
| 2,715,728 | Krohm | Aug. 16, 1955 |

FOREIGN PATENTS

| | | |
|---|---|---|
| 641,526 | Great Britain | Aug. 16, 1950 |